June 15, 1954

B. D. ASHBAUGH 2,680,883

INJECTION MOLDING MACHINE

Filed Aug. 4, 1950

INVENTOR.
Bernard D. Ashbaugh
BY
Schroeder, Merriam,
Hofgren & Brady, Atty's.

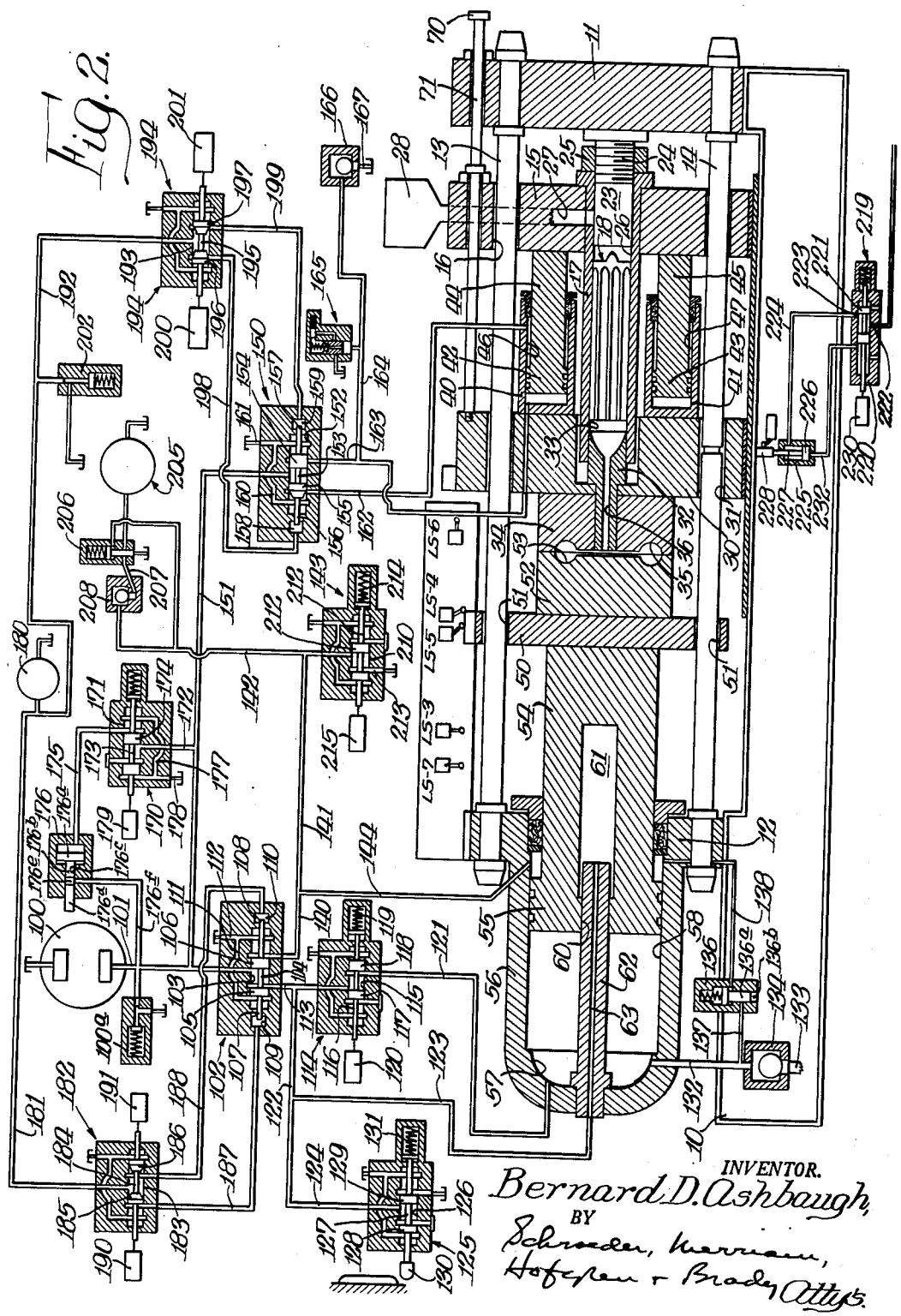

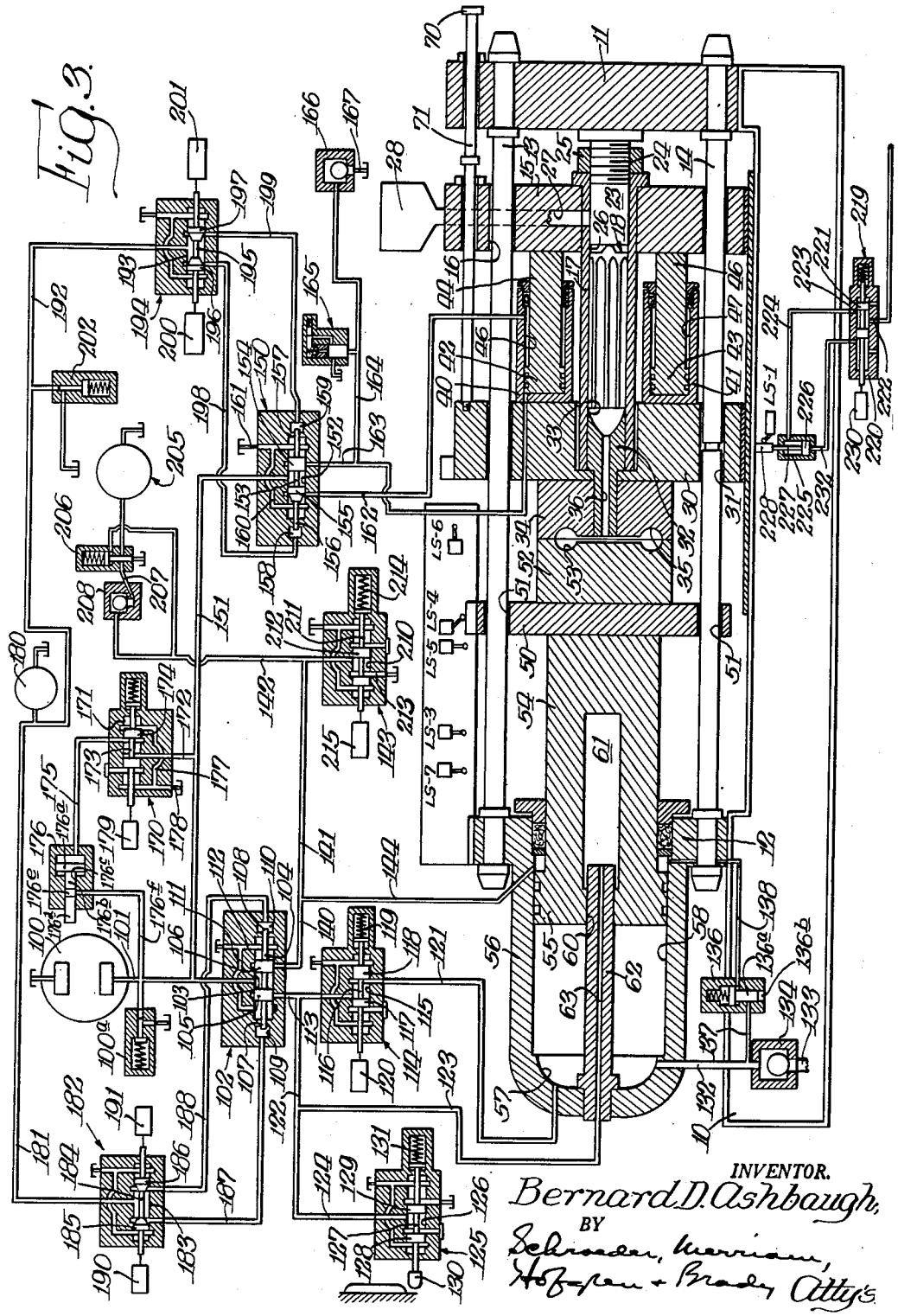

June 15, 1954  B. D. ASHBAUGH  2,680,883
INJECTION MOLDING MACHINE
Filed Aug. 4, 1950  6 Sheets-Sheet 5
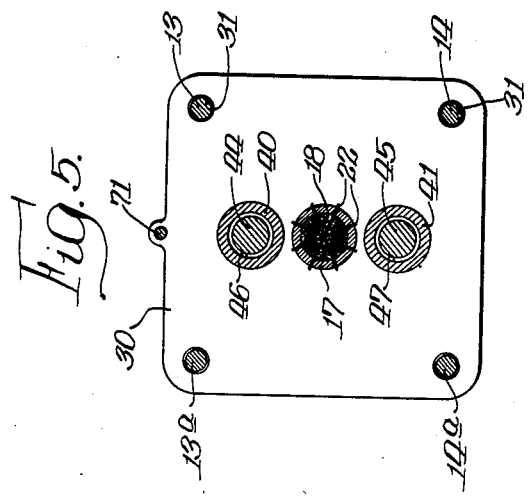
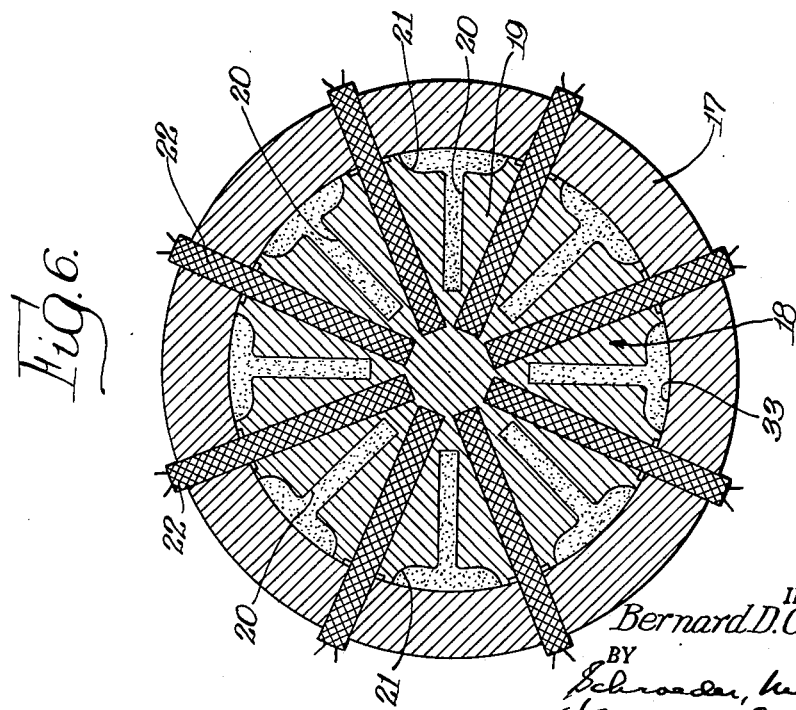
INVENTOR.
Bernard D. Ashbaugh June 15, 1954

B. D. ASHBAUGH 2,680,883

INJECTION MOLDING MACHINE

Filed Aug. 4, 1950

INVENTOR.
Bernard D. Ashbaugh
BY
Schroeder, Merriam,
Hofgren & Brady
Attys

Patented June 15, 1954

2,680,883

UNITED STATES PATENT OFFICE 2,680,883

INJECTION MOLDING MACHINE

Bernard D. Ashbaugh, Chicago, Ill., assignor to H-P-M Development Corporation, a corporation of Delaware Application August 4, 1950, Serial No. 178,811

14 Claims. (Cl. 18—30)

This invention relates to injection molding machines, and more particularly to a machine for injection molding of thermoplastic material.

It is the general object of this invention to produce an improved apparatus for injection molding of plastic material.

It is a more specific object of this invention to produce an apparatus for injection molding of thermoplastic material in which pressure necessary to move the material through a preheating zone and to inject the material into a mold are substantially reduced.

A further object of the invention is to produce an apparatus for injection molding of thermoplastic material in which granular material is moved into a preheating zone in one step and plasticized material is injected into a mold in a second step whereby to decrease the pressures necessary to move the material through each step.

A further object of this invention is to produce an apparatus for injection molding of plastic material in which granular material is moved into a preheating zone in one step, the movement being accomplished against only the resistance of material previously introduced into the preheating zone and in which the introduction of a fresh charge of granular material into one end of the preheating zone ejects an equal amount of plasticized material from the other end of the preheating zone into a space in an injection chamber and in which, after the above described movement of the material has been completed, the plasticized material in the injection chamber is then injected into a mold.

It is a further object of the invention to produce an injection molding apparatus of the type described in the preceding paragraphs in which clamping pressure is utilized first to move granular material into a preheating zone and simultaneously to eject plasticized material from the preheating zone into the injection chamber, and in which clamping pressure is then utilized to reduce the volume of the injection chamber to move the fluid plasticized material therein into the mold.

A further object is to produce an apparatus having a material handling cylinder with a preheating zone located in an intermediate portion of the cylinder to define a feed chamber at one end of the cylinder and an injection chamber at the other end of the cylinder and in which granular material in the feed chamber is moved into the preheating zone by relative movement between the cylinder and a first piston and, upon the completion of such movement, plasticized material in the injection chamber is injected therefrom into a mold by relative movement between the cylinder and a second piston.

A further object of the invention is to produce an apparatus as described above in which the first piston is fixed to a frame and in which the material is moved into the preheating chamber from the feed chamber by axial movement of the cylinder relative to the first piston and in which the material is injected from the injection chamber into a mold by axial movement of the second piston relative to the cylinder.

Yet another object of this invention is to provide an injection molding apparatus of the type described in the above paragraphs with a suitable hydraulic circuit including piston and cylinder devices and electrical controls therefor, to move the cylinder relative to the first piston to move granular material into one end of the preheating zone and simultaneously to move plasticized material from the preheating zone into the injection chamber and then to move the second piston relative to the cylinder to inject plasticized material into a mold, the control then operating to cause reversal of the movement of the cylinder and of the second piston to restore the original volume of the feed chamber and permit a successive charge of granular material to be introduced therein and to restore the original volume of the injection chamber to create a void therein for the reception of a successive charge of plasticized material.

Another object is to produce an apparatus as described in the preceding paragraphs in which the movement of the material through said chambers is in a substantially linear path.

Still another object of the invention is to produce a preheating means having a volume capacity substantially in excess of the mold, which means may be provided with spaced individually controllable heating elements for accurate control of preheating.

Yet another object of the invention is to produce a preheating means as described in the preceding paragraph in which the material is moved through elongated slots and in which the slots have substantially equal cross-sectional areas throughout their length.

Other and further objects of the invention will be apparent from the accompanying description and drawings, in which:

Figs. 1 to 4 inclusive are sectional views, somewhat schematic in character, showing the molding machine of this invention and its power circuit in various stages of the cycle of operation.

Fig. 5 is a sectional view along line 5—5 of Fig. 1;

Fig. 6 is an enlarged detailed view of the preheating means shown at the center of Fig. 5.

Figure 4:
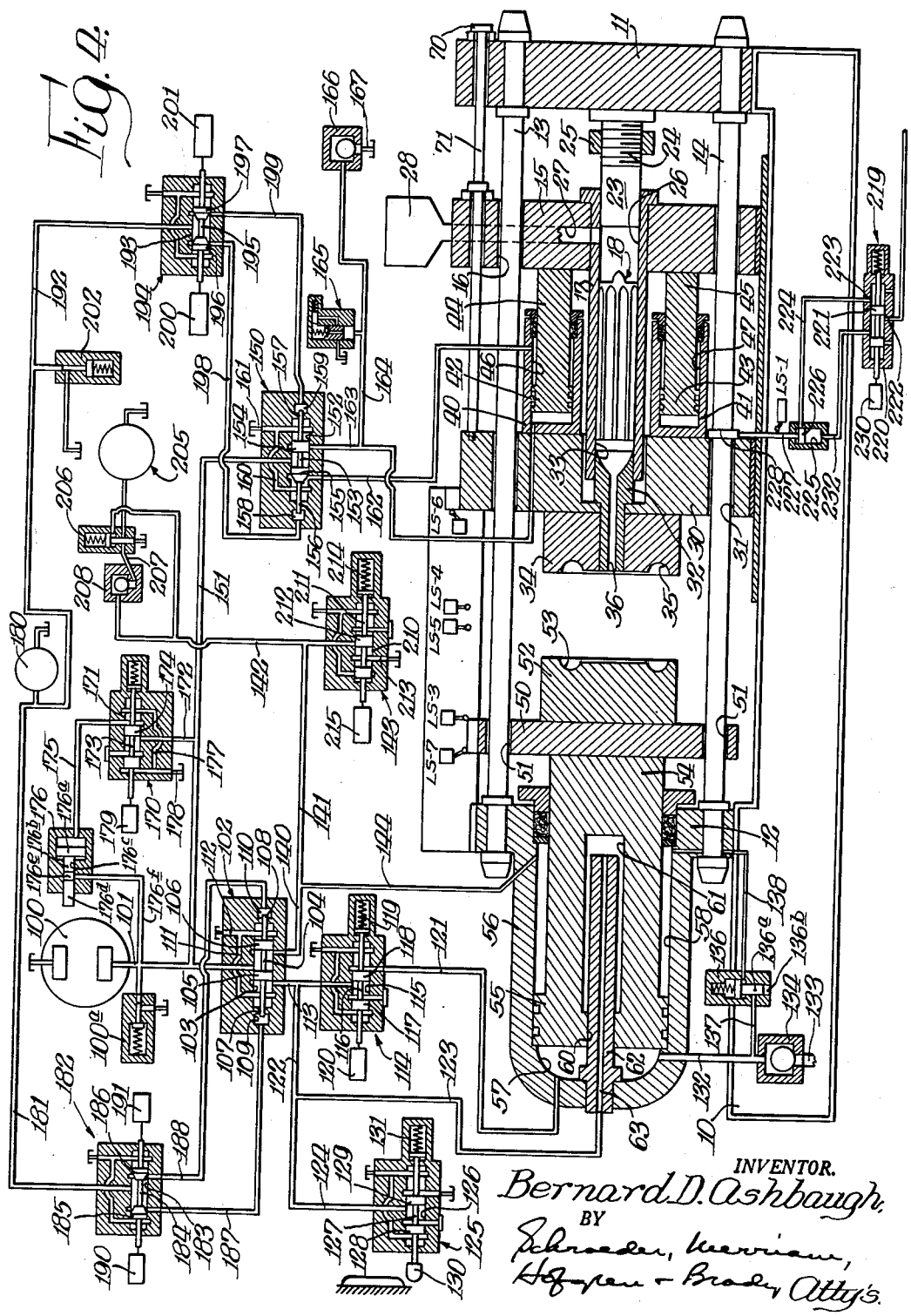

While the invention is susceptible of embodiment in many different forms, there is shown in the drawings and hereinafter described in detail, one specific embodiment, with the understanding that the present disclosure is to be considered as an exemplification of the principles of the invention and is not intended to limit the invention to the embodiment illustrated. The scope of the invention will be pointed out in the appended claims.

The injection molding apparatus

Referring to Fig. 1 of the drawings, there is shown a frame 10 at opposite ends of which there is mounted fixed crossheads 11 and 12. Two upper parallel rods 13 and 13a extend between the crossheads as do two lower rods 14 and 14a to provide guiding means for crossheads slidably mounted on the frame.

The first movable crosshead 15 is provided with suitable bearings 16 for reception of the rods and carries a material handling container in the form of a cylinder 17 thereon with the axis of the cylinder being parallel to the rods 13 and 14 and hence parallel to the direction of movement of the crosshead 15.

Located in an intermediate portion of the cylinder, and spaced from its ends, is a preheating cartridge 18. As best shown in Figs. 5 and 6, the preheating cartridge comprises a body 19 having a number of slot-like passages 20 extending longitudinally therethrough. The passages 20 are provided with an enlarged portion 21 adjacent their outer ends which opens to the sidewalls of the cylinder 17 so that the passages are substantially T-shaped in cross section as shown. The two portions 20 and 21 of the passages are preferably so proportioned as to have substantially equal cross-sectional areas at all points. Thus the portions 21 have a width substantially equal to the width of the slot portions 20. The total volume of the passages through the cartridge is in excess of the volume of the mold, and preferably, the volume of the passages is at least four times the volume of the mold. A number of individual heating elements 22 are provided in the cartridge with each element being spaced longitudinally along the length of the cartridge. Preferably each group of heating elements 22 lying in the same plane at right angles to the axis of the cylinder are controlled by a separate control in order that it be possible to graduate the amount of heat applied to the cartridge (and thus to the thermoplastic material in the passages) along its length. It is the purpose of the preheating cartridge to plasticize thermoplastic granular material and thus the degree of energy supplied to each group of heating elements may be controlled so as to produce the proper degree of plasticization of the granular material during its movement through the cartridge. Due to the fact that the volume of the passages is in excess of the volume of the mold, extreme heat is not necessary to cause proper plasticization of the material as the application of heat may be continued along the entire length of the cartridge and during the time the material remains therein, which may be for several cycles of the machine.

Extending into and closing the right-hand end (as seen in Fig. 1) of the cylinder 17 is a piston 23 which is fixed to the end crosshead 11. The piston is provided at its right-hand end with a threaded portion 24 to which a stop member in the form of a collar 25 is threaded. The cartridge 18 defines with the piston 23 a feed chamber 26 at one end of the cylinder. A passage 27 extending through the crosshead 15 opens at one end to the feed chamber and at the other end to a hopper 28 carried by the crosshead and adapted to contain a supply of granular thermoplastic material.

A second crosshead 30 is laterally spaced from the crosshead 15 and is also mounted for sliding movement along the frame. To this end the crosshead is provided with bearings 31 adapted to receive the rods 13, 13a, 14 and 14a. A second piston 32 is fixed to the crosshead 30 and extends into and closes the left-hand end of the cylinder 17. The piston 32 defines with the left-hand end of the cartridge an injection chamber 33 adapted to receive plasticized material from the preheating means. Also secured to the crosshead 30 is a die part 34 suitably designed to form half a mold portion 35. The mold is connected to the injection chamber by means of an injection passage 36 which extends axially through the piston 32.

A pair of hydraulic cylinders 40 and 41 are secured to the crosshead 30. Pistons 42 and 43 are reciprocable in the cylinders 40 and 41 respectively and are connected by means of piston rods 44 and 45 to the other movable crosshead 15. The pistons 42 and 43 are double-acting pistons adapted to urge the crossheads toward or away from each other depending upon whether hydraulic fluid under pressure is introduced to the left-hand end of the cylinders and against the head end of the pistons or into annular cylinders 46 and 47 formed by the space between the piston rods and the cylinders 40 and 41 and thus against the rod ends of the pistons.

A third crosshead 50 is slidably mounted on the frame and is provided with bearings 51 adapted to receive the rods 13, 13a, 14 and 14a to guide the crosshead. Fixed to the crosshead 50 is a die part 52 provided with a mold portion 53 matching the mold portion 35 in the die part 34 and adapted to form a mold therewith when the die parts are pressed together. Secured to the crosshead 50 is a connecting rod 54 attached at its opposite end to a double-acting piston 55 reciprocable in a cylinder 56 secured to the crosshead 12. The piston 55 is a double-acting piston adapted when hydraulic fluid is introduced into a chamber 57 at the head end of the piston to move the crosshead 50 and the die part 52 to the right and similarly adapted when hydraulic fluid is introduced into a pull-back cylinder 58 located in the space between the rod 54 and the cylinder 56 to move the crosshead and die part to the left.

The piston 55 is provided with a central axial opening 60 which connects with a larger opening 61 in the rod 54 to form a hydraulic cylinder in which a piston 62 is located. The portion 60 of the cylinder has substantially the same diameter as the piston 62 to form a packing therefor during reciprocation of the piston in the larger portion 61 of the cylinder. Hydraulic fluid under pressure may be introduced into the portion 61 by means of the conduit 63 which extends axially through the piston 62. The piston itself is secured to the left-hand end of the cylinder 56 as shown.

A collar 70 is secured to a rod 71 which extends through and is slidable in suitable openings in the crossheads 11 and 15. One end of the rod is secured to the crosshead 30 and the other end extends beyond the crosshead 11 and carries the collar 70.

The hydraulic circuit

A hydraulic circuit is provided for supplying fluid under pressure to move the die part 52 against the die part 34 to form therewith a mold and then to move the mold and cylinder 17 to the right to reduce the volume of the feed chamber 26 to move granular thermoplastic material into the preheating element 18 and simultaneously to move an equal amount of plasticized material into the injection chamber 33, and then to continue the movement of the mold and the piston 32 to the right to reduce the volume of the injection chamber to inject plasticized material into the mold. Suitable timing means are provided for determining the dwell of the die parts in closed position under clamping pressure and then to reverse the hydraulic circuit to separate the die parts and to reestablish the original volumes of the feed and injection chambers.

The high pressure circuit

A high pressure pump 100 is provided to furnish hydraulic fluid under high pressure to a conduit 101 which connects with a main pressure valve 102. A pressure relief valve 100a of usual construction is connected to the conduit 101 to tank fluid therein should the pressure exceed a predetermined amount. The main pressure valve is provided with a bore 103 in which a spool valve 104 is provided, the spool valve having two spaced lands 105 and 106. The valve is provided with piston-like end portions 107 and 108 which extend, respectively, into cylinders 109 and 110 formed in the ends of the valve 102 and adapted to receive pilot pressure to move the spool valve. The spool valve 104 is biased toward a position wherein the land 106 blocks the conduit 101. The biasing may be achieved in a well known manner, such as by springs (not shown) so that the absence or equality of pilot pressure in the cylinders 109 and 110 will cause the spool valve to shift to a position blocking conduits 113 and 140. The main pressure valve is provided with a by-pass passage 111 which connects with the bore 103 adjacent its left-hand end and also connects with a passage 112 leading to a sump or tank. The valve 104 is movable in the bore under pilot pressure to shift the land 105 into positions closing and opening a conduit 113 leading from the bore 103 into a high pressure distributing valve 114.

The high pressure distributing valve 114 is provided with a bore 115 in which a spool valve 116 having lands 117 and 118 is slidable. A spring 119 connected to the valve 116 biases the valve toward movement to the left and a solenoid 120 is provided for moving the valve to the right (the position shown in Fig. 2). The land 118 controls a conduit 121 which is connected to the cylinder 57 to act upon the head end of the piston 55 therein.

Also connected to the conduit 113 leading from the main pressure valve is a branched conduit 122 having one branch 123 connected to the passage 63 in the piston 62 and having another branch 124 connected to a safety valve 125.

The safety valve 125 is provided with a bore 126 in which a spool valve 127 having a pair of lands 128 and 129 is slidable. The spool valve is adapted to be moved to the left by means of a solenoid 130 and against the tension of a spring 131 which biases the valve toward movement to the right. The valve 127 is movable under the tension of the spring to a position tanking high pressure in the event a safety gate or other safety device on the machine is not closed before the press is put into operation, it being understood that the closing of such safety device energizes the solenoid 130 to move the valve to the position shown.

Connected to the space 57 at the head end of the main ram piston 55 is a drain passage 132 which is connected by means of a conduit 133 to the sump or tank. A ball check valve 134 is interposed between the passages 132 and 133 to restrict flow therethrough to flow toward the space 57 only. A suitable pressure relief valve 136 is connected to the passage 132 by means of a conduit 137 and to the pull-back cylinder area 58 by means of a passage 138. When pressure is introduced into the pull-back cylinder 58, that pressure is communicated by means of the passage 138 to the piston 136a in the relief valve 136. Should the pressure in the cylinder 58 exceed a predetermined amount, it serves to raise the piston 136a to establish communication between the passage 137 and passage 136b connected to the tank.

Also connected to the bore 103 of the main pressure valve 103 is a branched conduit 140 having a first branch 141 which connects with a conduit 142 connected to a low pressure valve 143 and a second branch 144 connected to the pull-back cylinder 58.

A second high pressure distributing valve 150 is connected to the high pressure pump conduit 101 by means of a conduit 151. The distributing valve 150 is provided with a bore 152 in which a spool valve 153 having a cylindrical land 154 and a conical land 155 is slidable. The spool valve 153 is provided with end portions which extend into cylinders 158 and 159 at the ends of the valve 150 to be acted upon by pilot pressure to shift the spool valve. Like valve 102, the spool valve of valve 150 is biased toward the position shown in Fig. 2 upon the absence or equality of pilot pressure in cylinders 158 and 159. The valve 150 is provided with a by-pass passage 160 which connects with a passage 161 connected to the tank, and with a conduit 162 controlled by the land 155 and opening to the pull-back areas 46 and 47 of the cylinders 40 and 41 to act against the rod end of the pistons 42 and 43 therein. A second conduit 163 opens into the bore 152 and is controlled by the land 154. The conduit 163 connects with the cylinders 40 and 41 at the head end of the pistons therein. Branching from the conduit 163 is a relief conduit 164 which connects with a pressure relief valve 165 and with the tank through the medium of a check valve 166 and passage 167.

Also connected to the conduit 151, intermediate the high pressure pump 100 and the distributing valve 150, is a high pressure control valve 170. The valve 170 is provided with a bore 171 connected to the conduit 151 by the passage 172 and in which a spool valve 173 is slidable. The spool valve carries a land 174 controlling the passage 172 and a control passage 175 which connects to control cylinder 176 in which a piston 176a is reciprocable. It is contemplated that the pump 100 will be a variable displacement type pump, for example a shiftable pintle type pump. For controlling the displacement of the pump, the piston 176a is provided with an extension 176b of lesser diameter which is reciprocable in a correspondingly smaller diameter cylinder 176c. A second small piston 176d is also reciprocable in the cylinder 176c with the space 176e between the pistons 176b and 176d being connected to the outlet conduit 101 by means of a conduit 176f.

The piston 176d may be connected to the pintle to shift the same, if such be the type of pump employed, or to the displacement control of whatever type of pump is used. Outlet pressure moves the piston 176a to the right when conduit 175 is disconnected from the pressure circuit while the area differential between piston 176a and 176b causes leftward movement of the pistons when both are subjected to discharge pressure. Such leftward movement, of course, forces piston 176d to the left to control the pump. A by-pass passage 177 extends through the valve as shown, opening at one end to the bore 171 and at the other end to a passage 178 connected to the tank. A solenoid 179 is provided to shift the spool valve 173, as hereinafter described.

Pilot pressure circuit

A suitable pilot pressure circuit is provided to control the operation of the main pressure valve 102 and of the second high pressure distributing valve 150. Included in the pilot pressure circuit is a low pressure pilot pump 180 connected by means of a first conduit 181 to a pilot pressure control valve 182. The valve 182 is provided with a suitable bore 183 in which a spool valve 184 is slidable, the spool valve carrying two conical lands 185 and 186 which control conduits 187 and 188 respectively. The conduit 187 opens into the cylinder 109 while the conduit 188 opens into the cylinder 110. Movement of the spool valve 184 directing pilot pressure into the cylinder 109 into the cylinder 110 or into both cylinders is accomplished by means of a first solenoid 190 connected to the left-hand end (as shown in Fig. 1) of the valve 184 and a second solenoid 191 connected to the right-hand end thereof. The valve 182 is so arranged as to return to neutral position, directing pilot pressure equally into both cylinders 109 and 110 of valve 102, whenever both solenoids 190 and 191 are deenergized.

A second conduit 192 is connected to the pilot pressure pump 180 and to the bore 193 of a second pilot pressure valve 194. Slidable in the bore is a spool valve 195 carrying a pair of conical lands 196 and 197 which control conduits 198 and 199 connected to the cylinders 158 and 159, respectively, of the second distributing valve 150. The valve 195 is movable to direct pilot pressure to either or both of the cylinders 158 and 159 (to move the valve 153 therein to the right or left or to return it to neutral) by means of solenoids 200 and 201 connected to opposite ends of the valve 195.

Also connected to the conduit 192 is a pilot pressure relief valve 202 of the usual construction to set an upper limit to the pilot pressure in the circuit.

The low pressure circuit

A low pressure pump and circuit is provided in the system to supply a relatively large quantity of oil at low pressure to supplement the volume of oil supplied by the high pressure pump on the return stroke of the ram to accelerate the return of the ram and the opening of the press at the end of each cycle of the press.

To this end there is provided a low pressure pump 205 connected to a conduit 207 which connects, through an intervening ball check valve 208, with the conduit 142. The conduit 142 connects, as previously described, to the low pressure valve 143. A back pressure relief valve 206 is provided to tank excessive pressure in the conduit 142 to safeguard the low pressure pump.

The low pressure valve 143 is provided with a bore 210 in which a spool valve 211 is slidable. The spool valve carries a land 212 which controls a port 213 connected to the tank and also controls the end of the conduit 142 opening into the bore. Movement of the land to the right to the position shown is accomplished by the tension of a spring 214 connected to the valve 211 and movement of the valve to the left is accomplished by means of a solenoid 215 connected to the left-hand end of the valve as shown.

By suitable arrangement of the electrical control system hereinafter to be described the valve 143 serves to direct low pressure oil through the conduits 142, 141 and 144 into the pull-back cylinder 58 to speed the movement of the ram to the left on its return stroke.

An additional safety feature is provided to prevent the initiation of a new cycle until the completion of the previous cycle and the restoration of the original volume to the feed chamber and to the injection chamber. To this end there is provided a cylinder 220 in which a piston valve 221 is slidable to control a port 222 connected to a source of pneumatic pressure and a port 223 connected to a conduit 224 which in turn connects to a cylinder 225 in which a piston 226 is reciprocable. Secured to the piston is a rod 227 having a collar 228 at its end which is adapted to contact the rod 14 as shown. Movement of the piston valve 221 is accomplished through a starting solenoid 230 to move it to the position shown in Fig. 1 admitting air pressure to the rod end of the piston 226 to retract the plunger to a point where it contacts a limit switch LS-1 to energize the electrical control circuit. If at the end of a cycle the crosshead 30 has not returned to its original position, upon release of the pneumatic pressure from the rod end of the piston and the introduction of pressure to the head end through the conduit 232, the collar 228 will be unable to return completely to its original position because of its contact with the crosshead 30. This limitation of the movement of the collar 228 is utilized to prevent initiation of a succeeding cycle.

The electrical control circuit

A suitable electrical circuit is provided to control the operation of the pilot circuit and hence of the main power circuit to produce a sequential operation of the press. It will be noted from Fig. 1 that limit switches LS-3 to LS-7 inclusive are located along the upper portion of the frame 10 in the line of movement of the crossheads 30 and 50 to be operated thereby. Limit switch LS-6 is held closed by contact with the crosshead 30 and is spring operated to open position when the crosshead 30 is moved to the right out of contact therewith. The other limit switches on the upper portion of the frame are normally open and are closed by movement of crosshead 50 thereagainst. Limit switch LS-1 on the lower portion of the frame consists of two contacts LS-1-a and LS-1-b, LS-1-a being normally open and LS-1-b being normally closed, which positions are reversed when the limit switch LS-1 is contacted by the clamp collar 228 as it is withdrawn at the initiation of a cycle.

Figure 7:
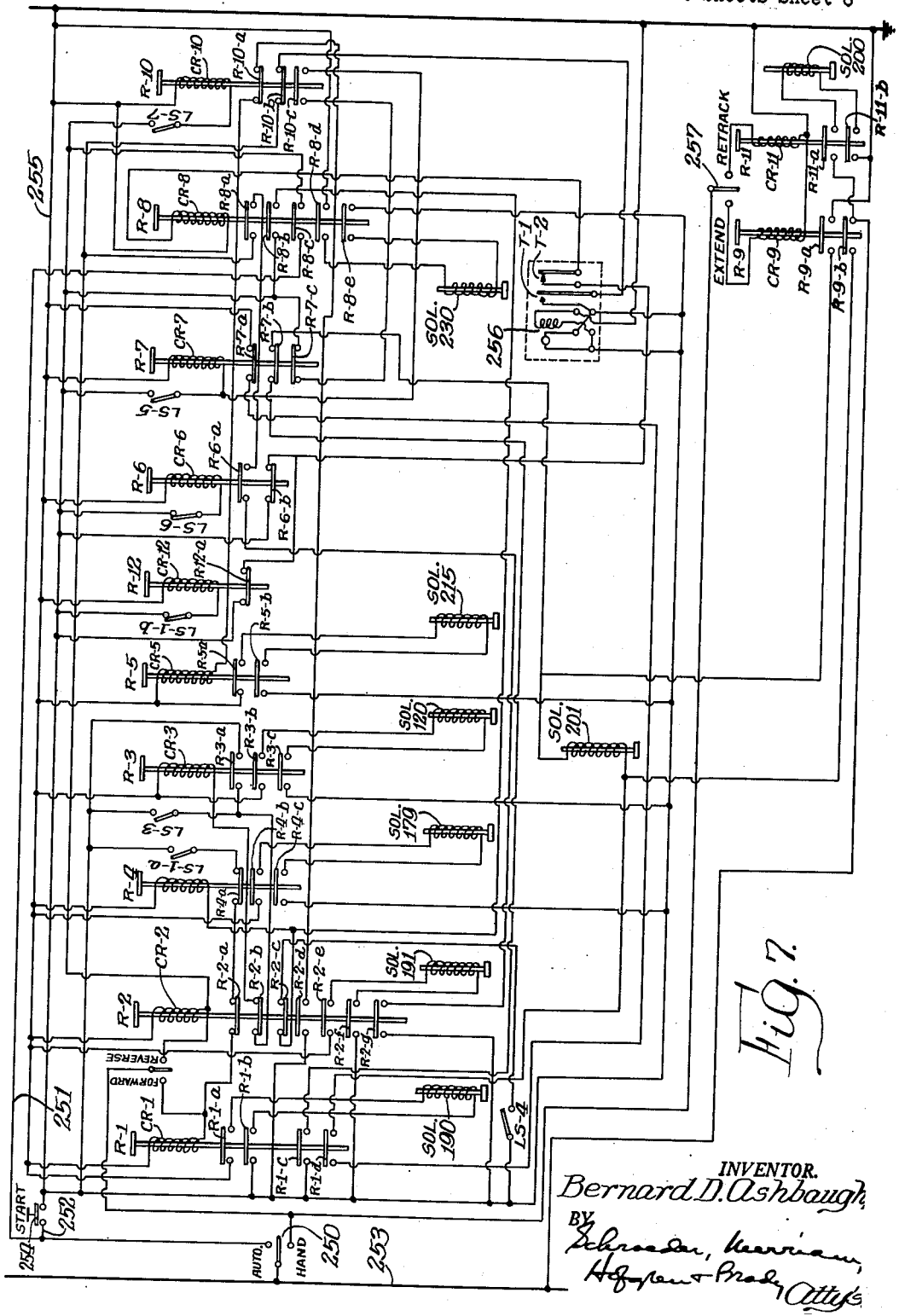
Fig. 7 is a schematic diagram of the electrical circuit.

The electrical circuit is shown diagrammatically in Fig. 7 and includes a number of contactors R-1 to R-12 inclusive which are operated by solenoid coils CR-1 to CR-12 associated therewith. Each contactor is provided with a number of contacts which, for the purpose of clarity, are identified by the number of the contactor with which they are associated together with an alphabetical letter as a suffix. Thus contactor R-1 is provided with four contacts R-1-a, R-1-b, R-1-c and R-1-d.

A selector switch 250 is provided in the circuit which may be moved to open position as shown and thence manually to "Automatic" or "Hand." The switch is adapted to connect feed lines 251 and 252 to the power line 253. A normally open starting button 254 is provided to energize holding circuits hereinafter to be described. A common ground line 255 is provided in the circuit.

A timer 256, which may be electrically driven as indicated, is provided in the circuit and controls timer contactors T-1 and T-2. The timer motor is, of course, adjustable to provide a variable time of dwell of the press during its operation. It is believed that the electrical circuit shown is self-explanatory and its operation and construction will become readily apparent from the following description of the operation of the press.

Operation

The operation of the press and the controls therefore will be described with relation to a single cycle of the press which, for the purposes of simplifying the description, will be taken as an intermediate cycle, that is, one which occurs after the press has been in operation. For this purpose it may then be assumed that the preheating cartridge 18 is completely filled with thermoplastic material, the material at the right-hand, or entering end of the cartridge being in somewhat granular form and the material at the left-hand end of the cartridge being in fluid plastic form due to the application of heat to the various heating elements longitudinally spaced along preheating passages.

To initiate a succeeding automatic cycle of the press, the selector switch 250 is set on "Automatic" to connect lines 251 and 252 with the power line 253. Starting button 254 is depressed to start timer motor 256, closing contactor T-2, and simultaneously to complete a circuit through closed contact R-6-b, timer contactor T-2 and in the solenoid coil CR-8 of the holding circuit R-8. The solenoid CR-8 of contactor R-8 holds in the contacts R-8-d and R-8-e which completes the circuit to solenoid 230. This allows air pressure to be admitted through the valve 219 to the rod end of the piston 226 to retract the clamp collar. When the clamp collar 228 is fully retracted, it actuates limit switch LS-1 to close LS-1-a and open LS-1-b. A circuit is completed from the line 251 through contacts R-8-c, LS-1-a, normally closed contacts R-6-a and R-2-a, to the coil CR-1 of contactor R-1. Contacts R-1-a and R-1-b of R-1 close thus completing the circuit through solenoid 190. This moves the valve 184 to the position shown in Fig. 1 directing pilot pressure through the conduit 188 and into the cylinder 110 to move the valve 104 to the position shown. At the same time solenoid 201 on the other pilot pressure valve has been energized. This circuit may be traced through power line 251, holding contact R-8-c, contact R-1-c, normally closed contact R-7-b, solenoid 201, contact R-1-d, and normally closed contact R-7-a to the ground line 255. Solenoid 201 moves the valve 195 to the position shown in Fig. 1 to direct pilot pressure through the conduit 198 into the cylinder 158 of the valve 150 to move the spool valve 153 to the position shown. With the valves 102 and 150 in this position, high pressure from the pump is directed into conduits 113, 122 and branch 123 and thence into the cylinder 61 of the ram to move the ram rapidly to the right to bring the die part 52 toward the die part 34. At the same time high pressure oil in the conduit 151 is directed through the valve 150 into the conduit 163, and hence into the cylinders 40 and 41 and against the head end of the pistons 42 and 43. The decrease of pressure in the main ram cylinder 57 serves to open the check valve 134 to permit oil to be drawn from the tank into the cylinder.

As the crosshead 50 moves to the right, it contacts and closes limit switch LS-3 which energizes the solenoid CR-3 of contactor R-3 through normally closed contact R-2-b and the CR-3 circuit is then held in by contact R-3-a. Solenoid 120 of the first distributing valve 114 is thereupon energized through contacts R-3-b and R-3-c to shift the spool valve 116 therein to the right to the position shown in Fig. 2 directing high pressure fluid through the conduit 121, into the chamber 57 at the head end of the piston 55. The chamber 57 constitutes, of course, the main power cylinder of the ram, which being of larger volume than the cylinder 61, causes the ram to continue its advance but at a slower rate. During this slow advance of the ram the die part 52 contacts the die part 34 to form therewith a mold and then to move the crossheads 30 and 15 as a unit to the right. Rightward movement of crosshead 30 allows limit switch LS-6 to open, deenergizing solenoid CR-6 of contactor R-6 to close contact R-6-a in the CR-2 circuit and open contact R-6-b in the CR-8 circuit. CR-8 is held in by contact R-12-a of contactor R-12. At the same time that LS-6 is allowed to open, limit switch LS-5 is closed by crosshead 50. With LS-5 closed, solenoid CR-7 of contactor R-7 is energized to open contact R-7-b to deenergize solenoid 201. This permits pilot valve 194 to move to neutral position directing pressure equally to cylinders 158 and 159 of distributing valve 150. Spool valve 153 of valve 150 thereupon moves to the position shown in Fig. 2 where land 154 blocks conduit 163 and traps the oil in the head end of the cushion cylinders 40 and 41.

As crossheads 15 and 30 continue the movement to the right, they carry the cylinder 17 along with them, until the right-hand end of the cylinder contacts the stop collar 25 to halt further rightward movement of the cylinder. During the movement above described, the high pressure oil trapped in the cylinders 40 and 41 operates against the head end of the pistons 42 and 43 to prevent relative movement between the two crossheads, and hence to prohibit relative movement between the piston 32 and the cylinder 17. As clearly shown in the drawings, relative movement occurs between the cylinder 17 and the fixed piston 23 to reduce the volume of the feed chamber 26 and force granular material therein into the preheating means 18. The movement of the granular material into the preheater 18 serves to eject an equal amount of plastic material from the left-hand end of the preheater and into the injection chamber 33, the above described movement of the material taking place only against the resistance of the material in and out of the preheating means and not being against any back pressure in the mold. After the cylinder has contacted the stop means 25 the ram continues to move, moving the crosshead 30 and the piston 32 to the right relative to the cylinder 17 to reduce the volume of the injection chamber 33. This movement is accomplished against the resistance of the trapped oil in the cushioning cylinders 40 and 41. Fluid in the cylinders 40 and 41 leaves therefrom through the conduits 163 and 164 and into the pressure relief valve 165. This valve includes a spring which may be set to permit the piston therein to establish a connection between the conduit 164 and the connection to the tank illustrated when any desired clamping pressure is exceeded. Preferably the valve is set to relieve at 5,000 lbs. per square inch, and pressure exceeding that amount is tanked as just described.

The forward travel of the ram progressively reduces the volume of the injection chamber 33 by moving the piston 32 toward the preheater to force plasticized material in the chamber through the injection passage 36 and into the mold. When the crosshead 50 contacts and closes limit switch LS-4, solenoid CR-4 of contactor R-4 is energized through contact R-2-c, and thereupon normally closed contact R-4-a in the CR-1 circuit opens thus deenergizing solenoid CR-1. Deenergization of CR-1 opens contacts R-1-a and R-1-b to deenergize solenoid 190 to permit the pilot valve 182 to move to neutral, the position shown in Fig. 3. In this position, pilot pressure is directed equally in conduits 187 and 188 to allow the main pressure valve 102 to move to the position shown, blocking off high pressure fluid from the ram. At the same time solenoid 179 of the high pressure relief valve 170 is energized through contacts R-4-b and R-4-c, to move the spool valve 173 to the left, allowing high pressure oil to pass through the valve 170 and enter the control cylinder 176 to reduce the displacement of the high pressure pump.

After a suitable period of dwell determined by the timer 256, timer contact T-1 closes to energize the solenoid of contactor CR-2 through normally closed contact R-10-b. This energizes solenoid 191 through contacts R-2-e and R-2-f to move the spool valve 184 to the left to direct pilot pressure to the cylinder 109 at the left-hand end of the main pressure valve 102 to shift the spool valve therein to the position shown in Fig. 4 in which high pressure is directed through the conduits 140 and 144 to the pull-back cylinder area 58 of the ram. Also contact R-2-d is closed to energize, through normally closed contact R-10-a, solenoid CR-5 of contactor R-5. This closes contacts R-5-a and R-5-b to energize solenoid 215 to move the spool valve 211 in the low pressure control valve 143 to the position shown in Fig. 4 in which low pressure oil is blocked from the tank and directed into the conduit 141 which connects with the conduit 144 to supplement the volume of oil moved by the high pressure pump and to speed the ram on its return stroke.

Fluid in the ram cylinders 57 and 61 is forced out through conduits 121 and 123, that in the latter circuit passing through the valve 114 and into conduit 113, and into the bore 103 of valve 102. From the bore, exhaust fluid is tanked through by by-pass passage 111. Fluid in the ram cylinders is also tanked through conduits 132 and 137 and valve 136 to the tank inasmuch as pressure in the pull-back cylinder 58 is transmitted through the conduit 138 to raise the piston 136a, establishing communication between the conduit 137 and the passage 136b to the tank.

The backward movement of the ram drags the crossheads 15 and 30 along with it due to the tendency of the material in the mold to stick in the molds and hold the die parts together. The movement of the crosshead 30 to the right terminates when the collar 70 secured to the rod 71 comes into contact with the outer face of the end crosshead 11. The reduction in pressure in the cylinder 40 created by the separation of the two crossheads in restoring the injection chamber to its original volume is filled with oil through suction check valve 167.

When the ram reaches its original starting position it actuates limit switch LS-7 which energizes the solenoid CR-10 of contactor R-10 to open contact R-10-b and thus deenergize solenoid CR-2 of contactor R-2. This action opens the contacts R-2-e and R-2-f to deenergize solenoid valve 191 and permits the spool valve 184 in pilot valve 182 to move to center. This allows the main pressure valve 102 to shift to neutral position blocking the high pressure pump 100 from the pump cylinder. Energization of solenoid CR-10 also opens contact R-10-a in the CR-5 circuit to deenergize CR-5. This opens contacts R-5-a and R-5-b, deenergizing solenoid 215 shifting spool valve 211 in valve 143 to the position shown in Fig. 1, allowing the low pressure pump again to discharge into the tank. Timer motor 256 then times out to open contactor T-2, deenergizing solenoid CR-8 which in turn opens contacts R-8-d and R-8-e deenergizing solenoid 230 and allowing the clamp collar 228 to come to rest in the original position shown in Fig. 1, and also to reset the circuit.

In the event that the ram and the various crossheads do not return fully to their original position, return movement of the clamp roller 228 may be initiated but cannot be completed because of its contact with the crosshead 30. LS-1 is so arranged that any upward movement of the clamp collar opens LS-1-a and closes LS-1-b. With LS-1-b closed CR-12 will be energized opening contacts R-12-a. Since the ram has not reached its fully retracted position, LS-6 remains open and thus contact R-6-b remains open. With contact R-6-b open, solenoid CR-8 cannot be energized and neither can CR-1 since LS-1-a is also open. Thus a new cycle cannot be initiated.

If a new cycle cannot be initiated because of the failure of the parts to return to their fully retracted position the selector switch 250 should be set on "Hand" and the selector switch 257 set on "Extend" to energize solenoid CR-9 of contactor R-9. This will close normally open contacts R-9-a and R-9-b to energize solenoid 201 directing pilot pressure to the distributing valve 150, to shift that valve directing high pressure oil into the cushion cylinders 40 and 41 and against the head end of the pistons 42 and 43 therein to shift the crossheads 15 and 30 relative to each other. The die head will then move until the clamp collar 228 is allowed to return to its original position.

If the failure of the clamp collar 228 to return is due to the fact that the feed chamber 26 has not been fully expanded, the switch 257 should be set on "Retrack" to energize solenoid CR-11 of contactor R-11 closing contacts R-11-a and R-11-b. This will energize solenoid 200 directing high pressure oil to the pull-back area 46 and 47 of the cushion cylinders and against the rod ends of the pistons 42 and 43 to pull the crosshead 15 forward to its fully retracted position.

It will be noted from inspection of Fig. 4 that the return movement of the piston 32 relative to the cylinder 17 restored to the injection chamber 33 its original volume. This movement of the piston 32 thereby creates a void in the injection chamber so that movement of the plasticized material thereinto from the preheating cartridge on the next cycle is facilitated. The plasticized material need move against only resistance of the material to movement through the preheating cartridge.

When the feed chamber 26 is restored to its original volume with movement of the cylinder 17 to the left, additional granular material in the passage 27 drops into the feed chamber, the volume of fresh material equaling the volume forced into the preheating cartridge during the preceding cycle.

By adjustment of the stop collar 25 the permissive distance of movement of the cylinder 17 relative to the piston 23 may be modified so as to determine the volume of granular material introduced into the feed chamber at the close of the cycle when the feed chamber is restored to its original volume with return movement of the cylinder.

If desired, additional heating elements may be located in the piston 32 and also adjacent the injection passage 36 to maintain the fluidity of the material therein from cycle to cycle and to restore fluidity to material which may have solidified therein during shutdown of the press.

I claim:

1. An injection apparatus for molding articles of thermoplastic material comprising a frame, a first crosshead mounted for sliding horizontal movement on the frame, a material handling cylinder mounted on the crosshead with its axis parallel to the direction of movement of the crosshead, a first die part mounted on the frame for linear movement in line with the axis of the cylinder, a hydraulic ram for moving the first die part, a second die part fixed to a second crosshead slidably mounted on the frame intermediate the first crosshead and the first die part, a first piston mounted on the second crosshead and closing one end of said cylinder, a second piston fixed to the frame and closing the other end of said cylinder, electrical preheating means located in and spaced from the ends of said cylinder, said preheating means defining with the first piston an injection chamber at one end of said cylinder and said preheating means defining with the second piston a feed chamber at the other end of said cylinder, an injection passage extending axially through the first piston and connecting the injection chamber with the second die part, means for feeding granular thermoplastic material to the feed chamber, a hydraulic circuit including pressure producing means connected to the ram for moving the first die part against the second die part to form therewith a mold and then to slide the crosseads as a unit along the frame to move the material handling cylinder axially toward the fixed piston to reduce the volume of the feed chamber to force granular thermoplastic material therein into the preheating means and to force preheated plasticized material from the preheating means into the injection chamber, adjustable stop means for terminating the axial movement of the material handling cylinder, a hydraulic piston and cylinder device having a piston connected to one of the crossheads reciprocable in a cylinder connected to the other crosshead and to said hydraulic circuit and operable during the above described movement of the first die part to prevent relative movement between the crossheads, pressure responsive means for releasing fluid from said hydraulic cylinder upon the termination of said axial movement of the material handling cylinder, said ram being adapted to continue the movement of the second crosshead to move the first piston in the material handling cylinder and toward the preheating means to reduce the volume of the injection chamber whereby to cause plasticized material therein to be injected through the injection passage and into the mold.

2. An injection apparatus for molding articles of thermoplastic material comprising a frame, a first crosshead mounted for sliding horizontal movement on the frame, a material handling cylinder mounted on the crosshead with its axis parallel to the direction of movement of the crosshead, a first die part mounted on the frame for linear movement in line with the axis of the cylinder, a hydraulic ram for moving the first die part, a second die part fixed to a second crosshead spaced from the first crosshead and slidably mounted on the frame intermediate the first crosshead and the first die part, a first piston mounted on the second crosshead and closing one end of said cylinder, a second piston fixed to the frame and closing the other end of said cylinder, electrical preheating means in said cylinder, said preheating means defining with the first piston an injection chamber at one end of said cylinder and said preheating means defining with the second piston a feed chamber at the other end of said cylinder, an injection passage extending axially through the first piston and connecting the injection chamber with the second die part, means for feeding granular thermoplastic material to the feed chamber, a hydraulic circuit including pressure producing means connected to the ram for moving the first die part against the second die part to form therewith a mold and then to slide the crossheads along the frame to move the material handling cylinder axially toward the fixed piston to reduce the volume of the feed chamber to force the material into the preheating means and to force preheated plasticized material from the preheating means into the injection chamber, adjustable stop means for terminating the axial movement of the material handling cylinder, a hydraulic piston connected to one of the crossheads and reciprocable in a cylinder connected to the other crosshead, said cylinder being connected to said hydraulic circuit during the above described movement of the first die part to prevent relative movement between the crossheads, pressure responsive means for releasing fluid from said hydraulic cylinder upon the termination of said axial movement of the material handling cylinder, said ram being adapted to continue the movement of the second crosshead to move the first piston in the material handling cylinder and toward the preheating means to reduce the volume of the injection chamber whereby to cause plasticized material therein to be injected through the injection passage and into the mold, and control means for the hydraulic circuit for reversing the ram sequentially to move the cylinder axially to expand the feed chamber to its original volume and to move the first piston away from the preheating means to expand the injection chamber to its original volume to create a void therein to receive a subsequent charge of plasticized material from the preheating means, and then to separate the die parts to open the mold.

3. An injection apparatus for molding articles of thermoplastic material comprising a frame, a material handling cylinder mounted for axial movement on the frame, a first and a second die part in line with the axis of the cylinder and mounted on the frame for movement along said line, a movable piston closing one end of said cylinder and fixed to the second die part, a second piston fixed to the frame and closing the other end of said cylinder, a cylindrical preheating cartridge in said cylinder intermediate the ends thereof, a plurality of slot-like passages extending longitudinally through the cartridge, said passages extending radially outwardly from the central portion of the cartridge and opening at their outer ends to the walls of said cylinder with said passages being enlarged at their outer ends to form with said cylinder substantially T-shaped preheating passages, a plurality of heating elements spaced along the cartridge on both sides of each passage, said cartridge defining with the movable piston an injection chamber at one end of the cylinder and said cartridge defining with the fixed piston a feed chamber at the other end of said cylinder, an injection passage extending axially through the movable piston and connecting the injection chamber with the second die part, means for feeding granular thermoplastic material to the feed chamber, a hydraulic circuit including pressure producing means, a hydraulic ram in the circuit and connected to the first die part for moving the first die part against the second die part to form therewith a mold and then to move the material handling cylinder axially toward the fixed piston to reduce the volume of the feed chamber to force granular thermoplastic material therein into the preheating passages and to force plasticized material in the preheating passages into the injection chamber, means for terminating the axial movement of the material handling cylinder, a plurality of hydraulic piston and cylinder devices connected to the material handling cylinder and to the second die part, said piston and cylinder devices being connected to said hydraulic circuit during the above described movement of the first die part to prevent relative movement between the movable piston and the material handling cylinder, pressure responsive means for releasing fluid from said piston and cylinder devices upon the completion of said movement of the first die part, said ram being adapted to continue the movement of the first die part to move the movable piston relative to the material handling cylinder and toward the cartridge to reduce the volume of the injection chamber whereby to cause plasticized material therein to be injected through the injection passage and into the mold.

4. An injection apparatus for molding articles of thermoplastic material comprising a frame, a cylinder mounted for axial movement on the frame, a first and a second die part in line with the cylinder and movably mounted on the frame, a movable piston closing one end of the cylinder and fixed to the second die part, a second piston fixed to the frame and closing the other end of the cylinder, a cylindrical preheating cartridge in the cylinder intermediate the ends thereof, a plurality of slot-like passages extending longitudinally through the cartridge, a plurality of heating elements spaced longitudinally along the cartridge on both sides of each passage, said cartridge defining with the movable piston an injection chamber at one end of the cylinder and said cartridge defining with the fixed piston a feed chamber at the other end of the cylinder, an injection passage extending axially through the movable piston and connecting the injection chamber with the second die part, means for feeding granular thermoplastic material to the feed chamber, means for moving the first die part against the second die part to form therewith a mold and then to move the cylinder with a mold axially toward the fixed piston to reduce the volume of the feed chamber to force granular thermoplastic material therein into the preheating passages and to force plasticized material in the cartridge into the injection chamber, stop means for terminating said axial movement of the cylinder, said moving means operating to continue the movement of the first die part to move the movable piston toward the cartridge to reduce the volume of the injection chamber whereby to cause plasticized material therein to be injected through the injection passage and into the mold.

5. An injection apparatus for molding articles of thermoplastic material comprising a frame, a cylinder mounted for axial movement on the frame, mold forming means comprising a first and a second die part in line with the axis of the cylinder and mounted on the frame for movement along said line, a movable piston closing one end of the cylinder and connected to the second die part, a second piston fixed to the frame and closing the other end of the cylinder, a cylindrical preheating cartridge in the cylinder intermediate the ends thereof, a plurality of preheating passages extending longitudinally through the cartridge and having a total volume substantially in excess of the volume of the mold, said cartridge defining with the movable piston an injection chamber at one end of the cylinder and said cartridge defining with the fixed piston a feed chamber at the other end of the cylinder, means for heating the preheating passages to plasticize a supply of the material therein, an injection passage extending through the movable piston and connecting the injection chamber with the second die part, means for feeding granular thermoplastic material to the feed chamber, means for moving the first die part against the second die part to form therewith the mold and then to move the cylinder axially toward the fixed piston to reduce the volume of the feed chamber to force granular thermoplastic material therein into the preheating passages and to force a portion of the plasticized material in the cartridge into the injection chamber, means for terminating said axial movement of the cylinder, resilient means biasing the cylinder and the movable piston against relative movement therebetween, said moving means operating to overcome the resilient means to continue the movement of the first die part to move the movable piston in the cylinder and toward the cartridge to reduce the volume of the injection chamber whereby to cause plasticized material therein to be injected through the injection passage and into the mold.

6. An injection apparatus for molding articles of thermoplatsic material comprising a frame, a material handling container movably mounted on the frame, a first and a second die part movably mounted on the frame, an injection member closing one end of the container, a feed member closing the other end of the container, a preheating element in the container intermediate the ends thereof and having a plurality of preheating passages extending therethrough, said element defining with the injection member an injection chamber at one end of the container and said element defining with the feed member a feed chamber at the other end of the container, means for heating the preheating passages, an injection passage extending through the injection member and connecting the injection chamber with the second die part, means for feeding granular thermoplastic material to the feed chamber, means for moving the die parts together to form a mold, means for causing relative movement between the container and the feed member to reduce the volume of the feed chamber to force granular thermoplastic material therein into the preheating passages and to force plasticized material in the preheating passages into the injection chamber, stop means for terminating said relative movement, and means operating upon the termination of said relative movement to cause relative movement between the injection member and the container to reduce the volume of the injection chamber whereby to cause plasticized material therein to be injected through the injection passage and into the mold.

7. An injection apparatus for molding articles of thermoplastic material comprising a frame, means forming a mold mounted on the frame, a cylinder mounted for axial movement on the frame, a movable piston closing one end of the cylinder and connected to the mold, a second piston fixed to the frame and closing the other end of the cylinder, electrical preheating means in the cylinder intermediate the ends thereof, said preheating means defining with the movable piston an injection chamber at one end of the cylinder and said preheating means defining with the fixed piston a feed chamber at the other end of the cylinder, an injection passage extending through the movable piston and connecting the injection chamber with the mold, means for feeding granular thermoplastic material to the feed chamber, means for sequentially moving the movable piston and the cylinder as a unit toward the fixed piston to reduce the volume of the feed chamber to force granular thermoplastic material therein into the preheating means and to force heated material in the preheating means into the injection chamber and then for terminating the movement between the fixed piston and the cylinder while moving the movable piston in the cylinder toward the preheating means to reduce the volume of the injection chamber to cause heated material therein to be injected through the injection passage and into the mold.

8. In an injection molding machine for thermoplastic material, in combination, a frame, means on the frame defining an elongated material handling container, means closing one end of the container and provided with an injection passage, means fixed to the frame and closing the other end of the container, a preheating cartridge in the container intermediate the ends thereof, said cartridge being spaced from the ends of the container to form with the first mentioned closing means an injection chamber at one end of the container and to form with the next mentioned closing means a feed chamber at the other end of the container, means for feeding granular thermoplastic material to the feed chamber, and means for sequentially moving the container and the first named closing means as a unit toward the last-named closing means to reduce the volume of the feed chamber to force granular thermoplastic material therein into the preheating cartridge and thereby to force plasticized material in the cartridge into the injection chamber and then for terminating the movement of the container while moving the first named closing means in the container and toward the cartridge to reduce the volume of the injection chamber to force plasticized material through the injection passage.

9. An injection apparatus for molding articles of thermoplastic material comprising a frame, a first crosshead mounted for sliding horizontal movement on the frame, a material handling cylinder mounted on the crosshead with its axis parallel to the direction of movement of the crosshead, a first die part mounted on the frame for linear movement in line with the axis of the cylinder, a cylinder fixed to the frame and having a double-acting piston therein forming a ram connected to the first die part for moving the same, a second die part fixed to a second crosshead spaced from the first crosshead and slidably mounted on the frame intermediate the first crosshead and the first die part, a first piston mounted on the second crosshead and closing one end of said material handling cylinder, a second piston fixed to the frame and closing the other end of said material handling cylinder, electrical preheating means in said material handling cylinder, said preheating means defining with the first piston an injection chamber at one end of said cylinder and said preheating means defining with the second piston a feed chamber at the other end of said cylinder, an injection passage extending axially through the first piston and connecting the injection chamber with the second die part, means for feeding granular thermoplastic material to the feed chamber, a hydraulic circuit including pressure producing means connected to the ram cylinder on one side of the piston therein for moving the first die part against the second die part to form therewith a mold and then to slide the crossheads along the frame to move the material handling cylinder axially toward the fixed piston to reduce the volume of the feed chamber to force the material into the preheating means and to force preheated plasticized material from the preheating means into the injection chamber, adjustable stop means for terminating the axial movement of the material handling cylinder, a piston connected to one of the crossheads and reciprocable in a cushioning cylinder connected to the other crosshead, said cushioning cylinder being connected to said hydraulic circuit during the above described movement of the first die part to prevent relative movement between the movable crossheads, pressure responsive means for releasing fluid from said cushioning cylinder upon the termination of said axial movement of the material handling cylinder, said ram being adapted to continue the movement of the second crosshead to move the first piston in the material handling cylinder and toward the preheating means to reduce the volume of the injection chamber whereby to cause plasticized material therein to be injected through the injection passage and into the mold, and control means for the hydraulic circuit for directing fluid under pressure to the other side of the ram piston sequentially to move the cylinder axially to expand the feed chamber to its original volume and to move the first piston away from the preheating means to expand the injection chamber to its original volume to create a void therein to receive a subsequent charge of plasticized material from the preheating means, and then to separate the die parts to open the mold.

10. An injection apparatus for molding articles of thermoplastic material comprising a frame, a first crosshead mounted for sliding horizontal movement on the frame, a material handling cylinder mounted on the crosshead with its axis parallel to the direction of movement of the crosshead, a first die part mounted on the frame for linear movement in line with the axis of the cylinder, a cylinder fixed to the frame and having a double-acting piston therein forming a ram connected to the first die part for moving the same, a rapid motion cylinder extending axially through the double-acting piston, a rapid motion piston fixed to the frame and reciprocable in the rapid motion cylinder, a second die part fixed to a second crosshead spaced from the first crosshead and slidably mounted on the frame intermediate the first crosshead and the first die part, a first piston mounted on the second crosshead and closing one end of said material handling cylinder, a second piston fixed to the frame and closing the other end of said material handling cylinder, electrical preheating means in said material handling cylinder, said preheating means defining with the first piston an injection chamber at one end of said cylinder and said preheating means defining with the second piston a feed chamber at the other end of said cylinder, an injection passage extending axially through the first piston and connecting the injection chamber with the second die part, means for feeding granular thermoplastic material to the feed chamber, a hydraulic circuit including pressure producing means, means connecting the pressure producing means to the rapid motion cylinder rapidly to move the first die part toward the second die part, control means including a member positioned in the path of movement of the first die part and operating when contacted thereby to direct hydraulic fluid to one side of the ram piston whereby to continue the motion of the first die part at a slower speed to bring the first die part against the second die part to form therewith a mold and then to slide the crossheads along the frame to move the material handling cylinder axially toward the fixed piston to reduce the volume of the feed chamber to force the material into the preheating means and to force preheated plasticized material from the preheating means into the injection chamber, adjustable stop means for terminating the axial movement of the material handling cylinder, a piston connected to one of the crossheads and reciprocable in a cushioning cylinder connected to the other crosshead, said cushioning cylinder being connected to said hydraulic circuit during the above described movement of the first die part to prevent relative movement between the movable crossheads, pressure responsive means for releasing fluid from said cushioning cylinder upon the termination of said axial movement of the material handling cylinder, said ram being adapted to continue the movement of the second crosshead to move the first piston in the material handling cylinder and toward the preheating means to reduce the volume of the injection chamber whereby to cause plasticized material therein to be injected through the injection passage and into the mold.

11. In an injection molding machine for thermoplastic material, preheating means comprising a cylinder, means closing one end of the cylinder and provided with an injection passage axially aligned therewith, means closing the other end of the cylinder, a cylindrical preheating cartridge in the cylinder intermediate the ends thereof, a plurality of slot-like passages in the cartridge, said passages extending radially outwardly from the central portion of the cartridge and opening at their outer ends to the walls of the cylinder with said passages being enlarged at their outer ends to form with said cylinder substantially T-shaped preheating passages extending longitudinally through the cartridge, and a plurality of individually controllable heating elements spaced along the cartridge on both sides of each passage.

12. In an injection molding machine for thermoplastic material having a mold, an injection chamber, a preheating chamber connected to the injection chamber, a feed chamber connected to the preheating chamber with said chambers being in alignment along a single line, means for feeding thermoplastic material to the feed chamber, a single hydraulic ram for sequentially contracting the feed chamber to force material therein into the preheating chamber and to force heated material in the preheating chamber into the injection chamber, and then for contracting the injection chamber to inject heated material into the mold, and means for preventing contraction of the injection chamber during the contraction of the feed chamber and for maintaining the feed chamber in contracted position during contraction of the injection chamber.

13. In an injection molding machine for thermoplastic material, heating means comprising a cylinder, a cylindrical preheating cartridge in the cylinder intermediate the ends thereof, a plurality of slot-like passages extending longitudinally through the cartridge, said passages extending radially outward from the central portion of the cartridge and opening at their outer ends to the walls of the cylinder with said passages being enlarged at their outer ends to form with said cylinder substantially T-shaped preheating passages extending longitudinally through the cartridge, and a plurality of individually controllable heating elements in the cartridge and spaced along the sides of each passage.

14. In an injection molding machine for thermoplastic material, heating means comprising an elongated cartridge, a plurality of T-shaped passages extending longitudinally through the cartridge, and a plurality of radially arranged separate heating elements in the cartridge and spaced along both sides of each passage.

References Cited in the file of this patent

UNITED STATES PATENTS

| Number | Name | Date |
|---|---|---|
| Re. 21,906 | Shaw | Sept. 23, 1941 |
| 2,203,620 | Smith | June 4, 1940 |
| 2,279,344 | Reid | Apr. 14, 1942 |
| 2,344,176 | Shaw | Mar. 14, 1944 |
| 2,373,939 | Bailey | Apr. 17, 1945 |
| 2,443,554 | De Mattia | June 15, 1948 |
| 2,476,550 | Jobst | July 19, 1949 |
| 2,482,243 | Burnham | Sept. 20, 1949 |
| 2,493,805 | Dinzl | Jan. 10, 1950 |
| 2,501,595 | Bohannon | Mar. 21, 1950 |

FOREIGN PATENTS

| Number | Country | Date |
|---|---|---|
| 641,142 | Germany | Jan. 22, 1937 |